(12) United States Patent
Gomez et al.

(10) Patent No.: US 9,841,827 B2
(45) Date of Patent: Dec. 12, 2017

(54) COMMAND OF A DEVICE BY GESTURE EMULATION OF TOUCH GESTURES

(71) Applicant: MOVEA, Grenoble (FR)

(72) Inventors: David Gomez, Grenoble (FR); Hubertus M. R. Cortenraad, Saint Egreve (FR)

(73) Assignee: Movea, Grenoble (FR)

( * ) Notice: Subject to any disclaimer, the term of this patent is extended or adjusted under 35 U.S.C. 154(b) by 160 days.

(21) Appl. No.: 14/370,811

(22) PCT Filed: Jan. 7, 2013

(86) PCT No.: PCT/EP2013/050132
§ 371 (c)(1),
(2) Date: Jul. 7, 2014

(87) PCT Pub. No.: WO2013/104570
PCT Pub. Date: Jul. 18, 2013

(65) Prior Publication Data
US 2015/0029095 A1     Jan. 29, 2015

Related U.S. Application Data

(60) Provisional application No. 61/584,643, filed on Jan. 9, 2012.

(51) Int. Cl.
*G06F 3/033* (2013.01)
*G06F 3/01* (2006.01)
(Continued)

(52) U.S. Cl.
CPC .............. *G06F 3/033* (2013.01); *G06F 3/017* (2013.01); *G06F 3/0346* (2013.01); *G06F 3/0416* (2013.01); *G06F 3/04883* (2013.01); *G06F 2203/04806* (2013.01); *G06F 2203/04808* (2013.01)

(58) Field of Classification Search
CPC ........ G06F 3/017; G06F 3/0416; G06F 3/033; G06F 3/0346; G06F 3/04883; G06F 3/0304; G09F 3/017; G06K 9/00355
See application file for complete search history.

(56) References Cited

U.S. PATENT DOCUMENTS 8,207,942 B2 * 6/2012 Northway ............. G06F 1/1626
345/169
8,456,381 B2 * 6/2013 Pering ................... G06F 3/1423
345/2.3
(Continued)

FOREIGN PATENT DOCUMENTS

EP          0961195        12/1999
EP          2096524 A2      9/2009
(Continued)

OTHER PUBLICATIONS

International Search Report and Written Opinion from PCT/EP2013/050132, dated Mar. 20, 2013.

*Primary Examiner* — Abbas Abdulselam
(74) *Attorney, Agent, or Firm* — Stroock & Stroock & Lavan LLP

(57) ABSTRACT

A user to machine interface emulates a touch interface on a screen. The interface is configured for operating in a touch emulation mode based on a triggering event. A triggering event may be a rotation around a first axis of an angle higher than a first threshold. Analysis of the amount of rotation around a second axis may be used to determine the number of fingers defining a specific touch gesture. An infinite variety of touch gestures may therefore be emulated by a remote control based on application context thus allowing for multiple uses of the touch screen machine from a distance.

19 Claims, 12 Drawing Sheets

| | Tap | Open an application, trigger a button ... |
|---|---|---|
| | Tap & Hold | Contextual menu, advanced options |
| | Flicks / Flings | Left / Right : used to navigate between items & screens previous / next commands<br><br>Up / down : used (less often) to navigate between items in vertical layout |
| | Vertical scrolling | Used to scroll smoothly content, web pages, documents |
| | Horizontal scrolling | Used to smoothly and precisely scroll items or content, or turn pages of document |
| | 2D drag | Used to navigate in picture, document, zoomed webpage |

| | Pinch / spread | Used for zooming in/out media, documents and web pages |
|---|---|---|
| | 2 finger rotate | Used for rotating media (e.g. maps, photos...) |
| | N-touch flicks /swipes | N from 2 to 4  Multi-finger swipes used e.g. to increase navigation options |
| | 5 touch pinch | Used as e.g. a home command |

(51) Int. Cl.
    *G06F 3/041*     (2006.01)
    *G06F 3/0488*   (2013.01)
    *G06F 3/0346*   (2013.01)

(56) References Cited

U.S. PATENT DOCUMENTS

| | | |
|---|---|---|
| 2002/0097229 A1 | 7/2002 | Rose et al. |
| 2004/0169674 A1* | 9/2004 | Linjama ................ G06F 1/1626 |
| | | 715/702 |
| 2004/0218104 A1 | 11/2004 | Smith et al. |
| 2008/0010616 A1 | 1/2008 | Algreatly |
| 2008/0165255 A1 | 7/2008 | Christie et al. |
| 2009/0153289 A1 | 6/2009 | Hope et al. |
| 2010/0146436 A1* | 6/2010 | Jakobson ............ G01C 21/3682 |
| | | 715/800 |
| 2010/0169842 A1 | 7/2010 | Migos |
| 2011/0157015 A1 | 6/2011 | Ye et al. |
| 2011/0163955 A1* | 7/2011 | Nasiri .................... A63F 13/06 |
| | | 345/158 |
| 2011/0179376 A1* | 7/2011 | Berestov .............. G06F 3/0482 |
| | | 715/779 |
| 2013/0162517 A1* | 6/2013 | Gay ....................... G06F 3/046 |
| | | 345/156 |

FOREIGN PATENT DOCUMENTS

| | | |
|---|---|---|
| EP | 2175350 A1 | 4/2010 |
| WO | 2011/058528 | 5/2011 |

* cited by examiner

FIG.1a

| | | |
|---|---|---|
| 👆 | Tap | Open an application, trigger a button ... |
| 👆 | Tap & Hold | Contextual menu, advanced options |
| ☝ | Flicks / Flings | Left / Right : used to navigate between items & screens previous / next commands<br><br>Up / down : used (less often) to navigate between items in vertical layout |
| ↔ | Vertical scrolling | Used to scroll smoothly content, web pages, documents |
| ↕ | Horizontal scrolling | Used to smoothly and precisely scroll items or content, or turn pages of document |
| ✥ | 2D drag | Used to navigate in picture, document, zoomed webpage |

FIG.1b

| | | |
|---|---|---|
| 🤏 | Pinch / spread | Used for zooming in/out media, documents and web pages |
| 🔄 | 2 finger rotate | Used for rotating media (e.g. maps, photos...) |
| | N-touch flicks /swipes | N from 2 to 4  Multi-finger swipes used e.g. to increase navigation options |
| | 5 touch pinch | Used as e.g. a home command |

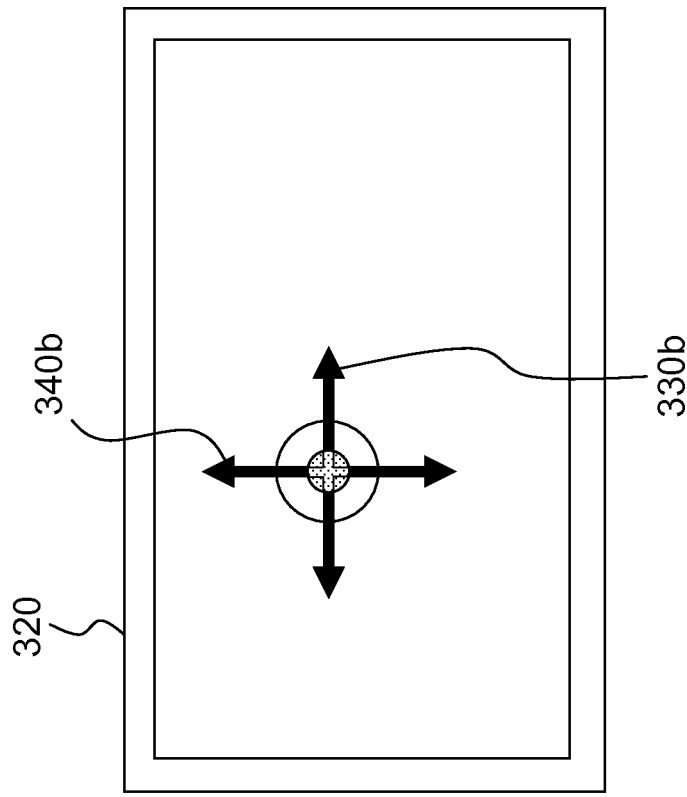
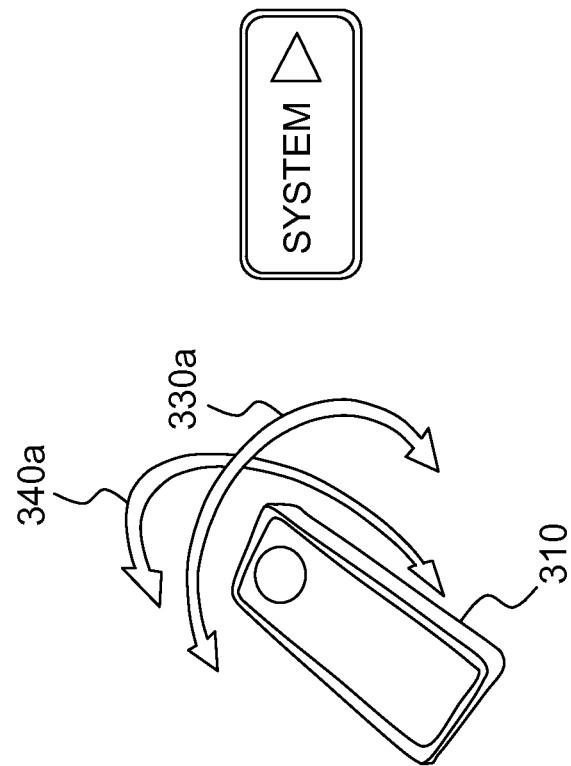
FIG.3

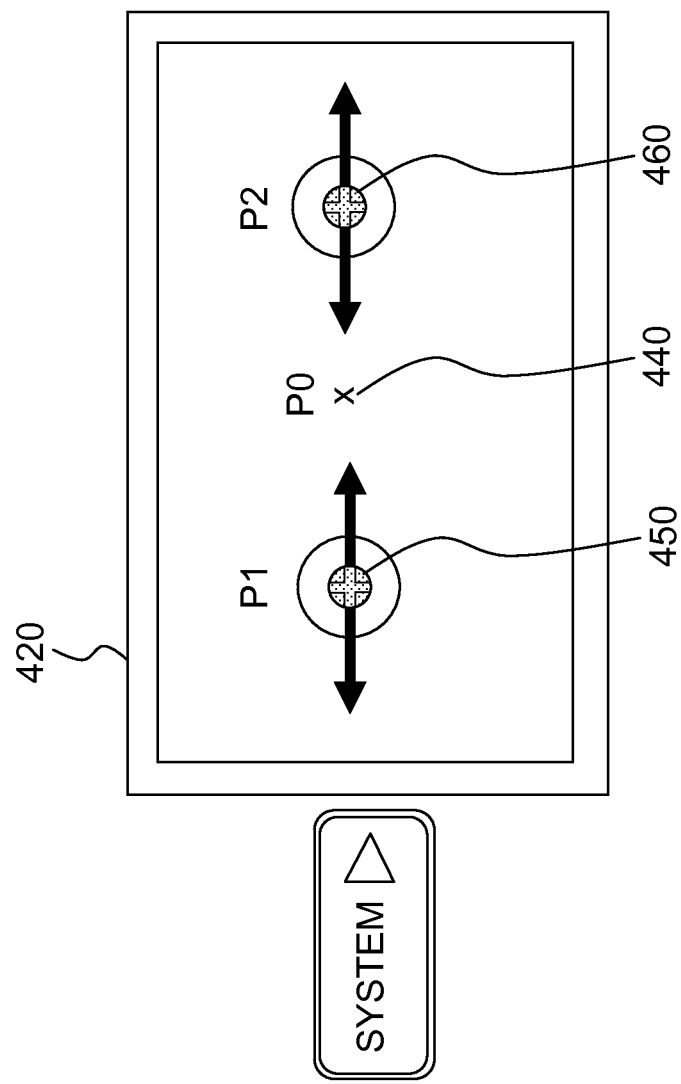
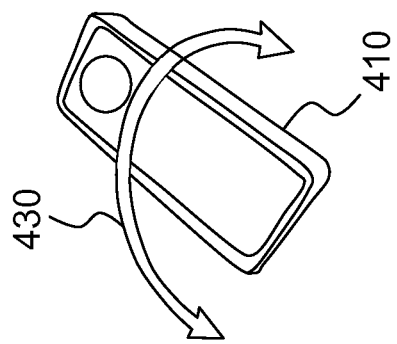
FIG.4

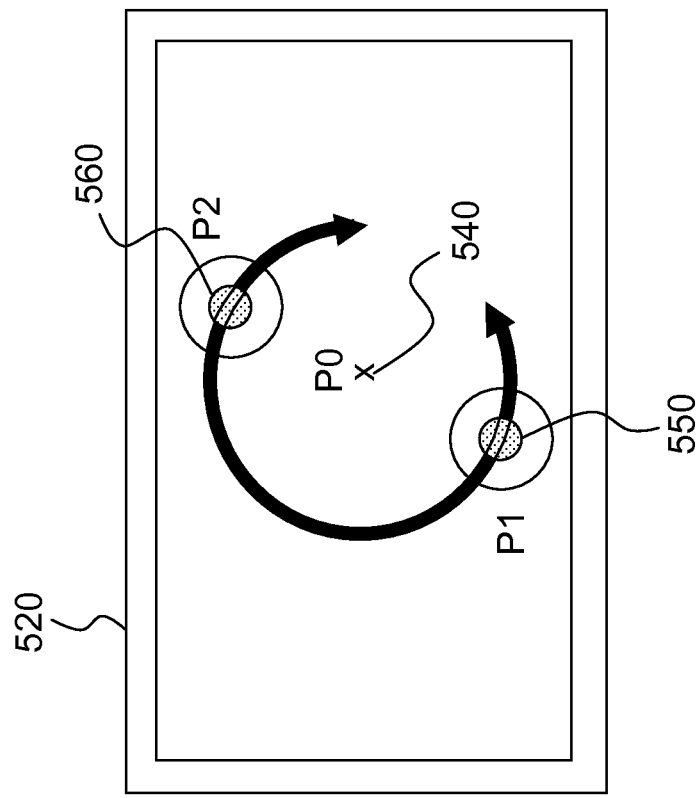
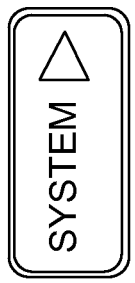
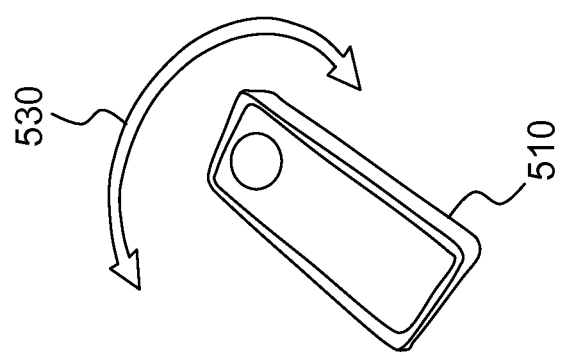
FIG.5

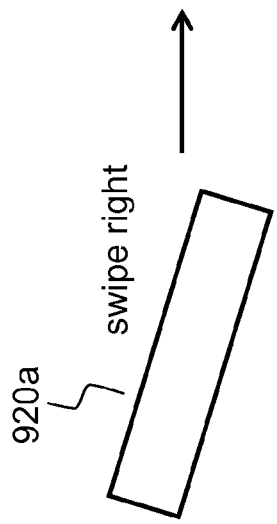
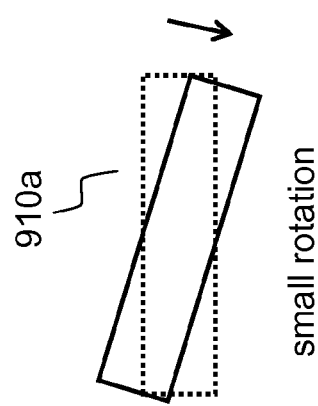
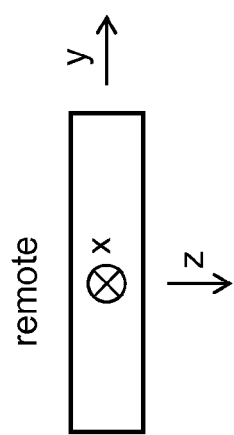
FIG.9a
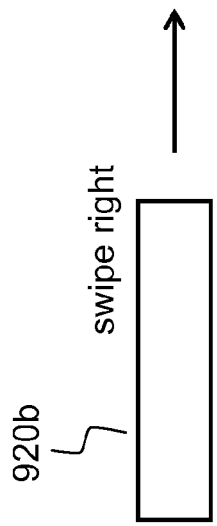
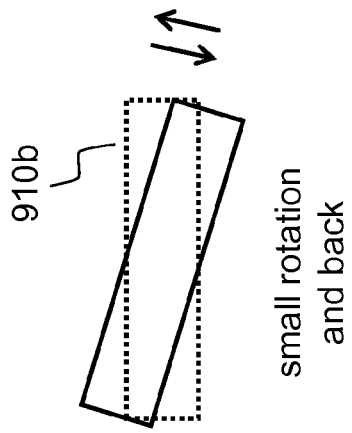
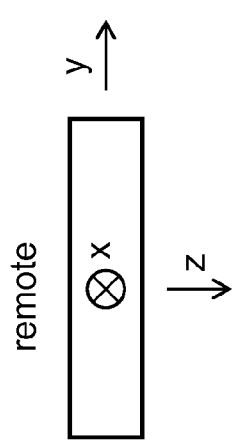
FIG.9b

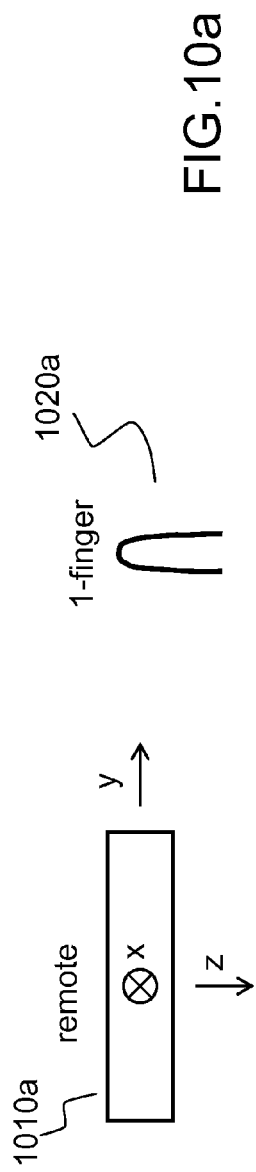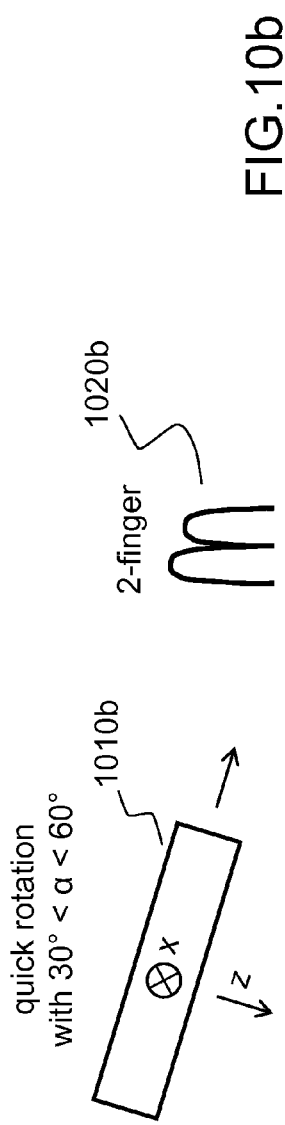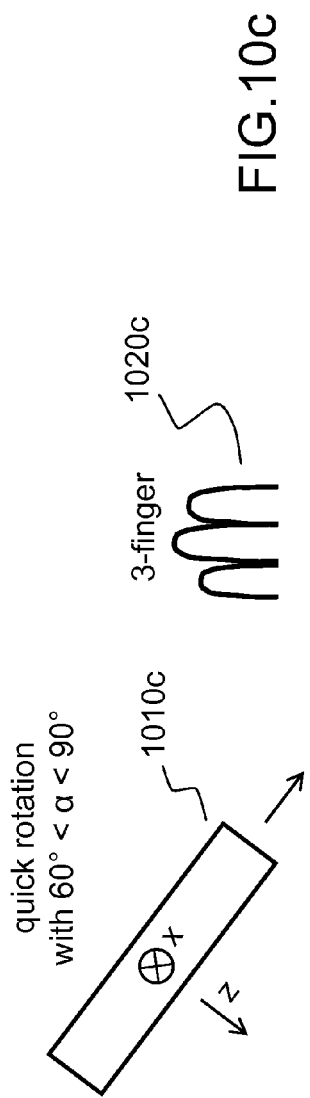

COMMAND OF A DEVICE BY GESTURE EMULATION OF TOUCH GESTURES

CROSS-REFERENCE TO RELATED APPLICATIONS

This application is the National Stage of International Application No. PCT/EP2013/050132, filed on Jan. 7, 2013, which claims the benefit of U.S. Provisional Application No. 61/584,643, filed Jan. 9, 2012. The contents of all of these applications are incorporated herein by reference.

BACKGROUND OF THE INVENTION

1. Field of the Invention

Various embodiments of the present invention deal with man machine interfaces capable of remotely sending commands to electronic devices. More specifically, various embodiments relate to motion capture devices, such as remote controls or air mice used for recognizing gestures used as a command code for electronic devices having a touch screen, such as tablets devices including the i-Pad™ from Apple™, the Galaxy™ from Samsung™, the Nexus™ from Google™ or the Surface™ from Microsoft™.

2. Description of the Related Art

Touch screen devices are, in their standard operating modes, controlled by a direct interaction of the user with the tactile surface of the screen. But such tablets can be used to watch movies, play games, or display presentations. In this case, the user sits or stands at a distance from the tablet and it would be advantageous to be able to still control the device without touching it. A remote control or an air mouse normally controls the motion of a single point (a cursor) on a screen it is pointing at, and the functions controlled by the cursor may be triggered by a button on the remote. Using a remote control is inherently different from direct interaction with a touch screen where the user is controlling the functions of a tablet by tapping, holding, scrolling, dragging or rotating one or a plurality of fingers directly on the screen. In this direct interaction, there is no cursor and no button and the control is more intuitive. Moreover, when more than one finger is used, there is no direct correspondence to a single cursor controlled by a remote control/air mouse.

U.S. Patent Publication No. 2007/0208528, incorporated herein by reference, discloses a system wherein a device is controlled by an input device producing sensor signals which are converted into a second set of signals comprising signals substantially similar to the touch-screen input signals from the touch screen device.

But the signal conversion process of this prior art system is complex and does not solve the problem of how to use a remote control to control the functions of a device with touch commands, especially when these touch commands consist of multi-touch actions where the interactions of more than one finger need to be interpreted by a target device.

SUMMARY OF THE INVENTION

The various embodiment systems of this invention solve this problem by using procedures which allow direct control of the touch commands of a device from the orientation/movement of a remote control imparted by the user with specific gestures, notably around specific axes, and without any need to convert the motion signals into another type of signals.

To this effect, preferred embodiments disclose a user to machine interface comprising at least a remote control with motion sensing capabilities, a communication link between the remote control and the machine, processing capabilities for processing the motion signals from said motion sensing capabilities; said processing capabilities being further configured for initiating a touch emulation mode based on a triggering event, recognizing at least a gesture of a user with a remote control, and passing the output of said recognition to an operating system of the machine.

Advantageously, the touch emulation mode comprises a definition of a number N representative of a number of points on a screen connected to the machine, the movement and/or position of the points being controlled by the output of the recognition.

Advantageously, the movement and/or position of the points are part of the output of the recognition.

Advantageously, the triggering event is one of a contextual change in an application run by the machine, a press of a button on a remote control by a user and a gesture of a user with a remote control.

Advantageously, a gesture of a user with a remote control controls a joint movement of the N points on the screen.

Advantageously, the triggering event is a gesture of rotation imparted by a user to a remote control around a predefined axis of said remote control, with one of an angle of rotation and an energy of motion higher than a preset threshold.

Advantageously, the definition of number N is given by one of the triggering event and a gesture of a user with a remote control.

Advantageously, the gesture is a rotation around a predefined axis, and the definition of number N depends on the angle of rotation $\alpha$ of the remote control around said axis.

Advantageously, for a range of angle $\alpha$ from a threshold $\alpha_{min}$ to a maximum $\alpha_{max}$ and a maximum number of points $N_{max}$ to be controlled by the remote control, N is defined by two plus the integer quotient of $(\alpha-\alpha_{min})/(\alpha_{max}-\alpha_{min})*(N_{max}-1)$.

Advantageously, the gesture being recognized defines a pressure applied by a user to a screen connected to the machine.

Advantageously, the gesture is a rotation around a predefined axis of angle $\alpha$, said angle $\alpha$ defining the pressure applied by the user to the screen.

Advantageously, the interface of various embodiments of the invention is further configured for use by at least two users, at least one of them with a remote control for operating the interface in a touch emulation mode.

Advantageously, each one of the users using a remote control is defined by an index which is used to identify the gestures being recognized.

Advantageously, the processing capabilities can cause a remote control to operate in the touch emulation mode based on the determination that the machine is capable of recognizing movement and/or position of the points.

Various embodiments of the invention also disclose a method of operating a user to machine interface comprising: moving in space by at least a user a remote control with motion sensing capabilities; using a communication link between the remote control and the machine; processing signals from the motion sensing capabilities; said method further comprising initiating a touch emulation mode based on a triggering event, recognizing a gesture imparted by a user to a remote control, and passing the output of said recognition to an operating system of the machine.

Advantageously, the touch emulation mode comprises a definition of a number N representative of a number of points on a screen connected to the machine, the movement and/or position of the points being controlled by the output of the recognition.

Advantageously, a rotation around a predefined axis of the remote of an angle α defines a touch gesture of pinch/spread zooming of factor k said factor k of zooming being a function of said angle α.

Advantageously, a rotation around a predefined axis of the remote of an angle α defines a touch gesture of rotation of said angle α.

Advantageously, number N is at least partly defined by a value of an angle of a rotation around an axis of a remote control imparted by a user of said remote control relative to a threshold angle.

A preferred embodiment of the motion enabled remote control of the invention does not need any modification of the hardware or motion algorithms (pointing or gesture recognition) to operate in the touch emulation mode as proposed in this invention. The remote control system can be easily adapted by including a library for the conversion of the motion gestures and commands into touch commands.

Also, the same device can be used to control a multiplicity of apparatuses, be they touch sensitive or not, which may be programmed for different classes of applications running on different operating systems. Since the preferred embodiment device of the invention directly controls the functions (by mimicking the touch command), it does not interfere with the signals which are themselves generated by the touch commands. Therefore, the compatibility of the preferred embodiment of the invention with these various types of devices, different operating systems and various classes of applications is easy to ensure. The developers only need to know what is the functional definition of each touch command to be able to insert the correct definition of a configuration of the remote which is representative of the touch command into the Application Programming Interface. Advantageously, the preferred embodiment device of the invention can use the three degrees of freedom if enough motion sensor axes are embedded in the remote control. If that is the case, the device can emulate not only 2D finger/stylus movements on the touch surface but also the touch pressure on this surface.

BRIEF DESCRIPTION OF THE DRAWINGS

The invention will be better understood and its various features and advantages will become apparent from the description of various embodiments and of the following appended figures:

FIGS. 1a and 1b represent examples of respectively single touch and multi-touch gestures;

FIG. 3 represents an embodiment of the invention where the remote control is used to emulate a single touch gesture;

FIG. 4 represents an embodiment of the invention where the remote control is used to emulate a zoom command from roll orientation;

FIG. 5 represents an embodiment of the invention where the remote control is used to emulate a rotate command from yaw orientation;

FIGS. 9a and 9b represent a remote, the gesture of the user and the corresponding touch command in a specific embodiment of the invention;

FIGS. 10a, 10b and 10c represent respectively a remote in a command position and the position of the fingers of the user in a specific embodiment of the invention;

DETAILED DESCRIPTION OF THE PREFERRED EMBODIMENTS

FIGS. 1a and 1b represent examples of respectively single touch and multi-touch gestures.

Touch interaction has the following characteristics:

It can be multi-touch; i.e. a user can touch the tactile surface in multiple locations at the same time;

There are three degrees of freedom: horizontal (1) and vertical (2) translation on the tactile surface, and pressure (3) on the tactile surface;

A user knows the result that he/she wants to achieve with a 1:1 relation: he/she touches directly what he/she wants to interact with; there is no need for a position or a "on over" feedback in the Graphical User Interface (GUI).

Tactile operating systems in commercial use are for example Apple iOS, Google Android and Microsoft Windows and other touch-based systems. Examples of standard single touch and multi-touch gestures defined in these systems are displayed respectively on FIGS. 1a and 1b.

FIG. 1a:

A single tap with a finger on the touch screen triggers the opening of an application with an icon at the location of the tap;

A "Tap and hold" touch opens a contextual menu with options;

"Flicks/flings" are used to navigate between previous/next screens (left/right) or between items in a vertical layout (up/down). The term "swipes" is also commonly used;

Vertical scrolling is used to scroll content of pages;

Horizontal scrolling is used to scroll items or to turn pages;

2D drag is used to navigate in picture or document.

Figure 2:
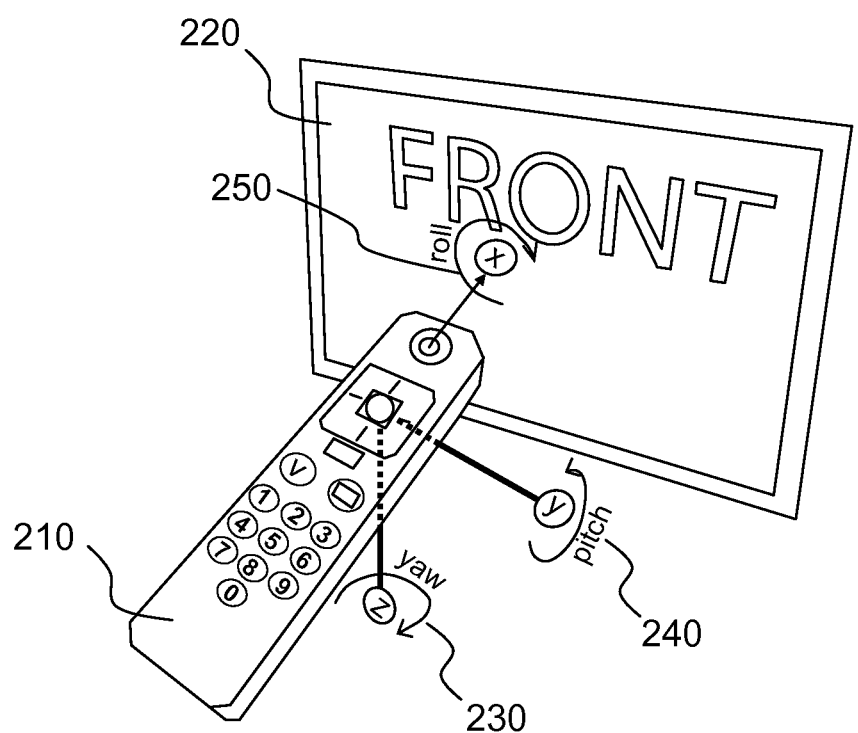
FIG. 2 represents a remote control positioned in front of a touch screen in an embodiment of the invention.

FIG. 1b:

Pinch/spread is used to zoom in or out within media content;

"Two finger rotate" is used to rotate a page, picture, or map;

"N touch flicks/swipes" (N between 2 and 4) are used for generating specific commands according to settings by the user or the system. Also referred to as "multi-finger swipes";

"5 touch pinch/spread". A 5-finger pinch can for example be used as a "home" command;

FIG. 2 represents a remote control positioned in front of a touch screen in an embodiment of the invention.

Motion sensed interaction using a remote control 210 has the following characteristics:

It is mono-point;

There are three degrees of freedoms: yaw rotation (230), pitch rotation (240) and roll rotation (250). (In addition there are 3 degrees of translation, but these are not commonly used in motion enabled remote controls.)

When using a remote to control a screen 220 with a Graphical User Interface (GUI), a user interacts indirectly. There is no direct relation between what the user wants to achieve and the control. Usually the GUI implements a feedback for showing the position on the screen (cursor), or for the confirmation of the activation of an element after clicking a button or recognizing a simple or a more complex gesture. This is for instance the case for the device disclosed by U.S. patent application Ser. No. 13/631,134, which is incorporated herein by reference, where the user can seamlessly switch between a pointing and a gesture recognition mode, said application being hereby incorporated by reference in the present application.

The pointing device 210 or pointer advantageously has the form and the shape of a television remote control, that is to say it is of elongate form, able to be held in the user's hand. The pointer is associated with a mobile element, for example a cursor able to move on a screen 220 controlled by a base station. The base station can be a fixed computer, a mobile computer, a tablet, a game console, a set top box, etc. The movements of this mobile element are controlled by the movements of the pointer. The pointer is advantageously provided with buttons on several of its faces to control the functions of the base station to which access is made possible by the remote control. The pointer comprises a power supply and a channel of transmission to the base station of the object to be controlled (not shown). Radiofrequency transmission can be effected with a Bluetooth waveform and protocol or with a Wi-Fi waveform and protocol (Standard 802.11g). Transmission can be performed by infra-red or by radiofrequency. The transmitted signals are the commands corresponding on the one hand to the depression of one of the buttons present on the body of the pointer, which triggers the execution of a function, and on the other hand to the sensing of the movement of the pointer so as to control the movements of a cursor on the control screen or perform a gesture recognition. These control signals may be generated by a computation module (not shown) either embedded in the pointer itself, or embedded into the base station or distributed between the pointer and the base station. The computation module may advantageously comprise a sub-module for compensating for the torsion imparted to the pointer by the user. The pointer comprises at least a computation module that deals with some processing of the buttons and some processing of the motion sensors. This computation module comprises a microprocessor, for example a DSP Texas Instruments TMS320VC5509 for the most demanding applications in terms of computation time, or a 32-bit microcontroller with ARM core, for example one of those from the STR9 family, notably the STR9F12FAW32 from STM. The computation module also preferably comprises a flash memory necessary for storing the code to be executed and the permanent data which it requires and a dynamic work memory. The computation module receives as input the outputs from the motion sensing capabilities. For example, the system can use angular velocity sensors (not shown), which have the function of measuring the rotations of the pointer in relation to two or three axes. These sensors are preferably gyrometers. It may be a two-axis gyrometer or a three-axis gyrometer. It is for example possible to use the gyrometers provided by Analog Devices with the reference ADXRS300. But any sensor capable of measuring angular rates or velocities is usable. It is also possible to use magnetometers, where the measurement of its displacement with respect to the terrestrial magnetic field makes it possible to measure the rotations with respect to the frame of reference of this field. It is, for example, possible to use the magnetometers with the reference HMC1001 or HMC1052 from the company Honeywell or KMZ41 from the company NXP.

Whichever sensors are used, their measurements are read in the frame of reference of the pointer. During a gesture, it is difficult to keep this frame of reference identical to the frame of reference of the user and to the frame of reference of the screen. Therefore, the measurements may suffer a bias which will give rise to inconsistent displacements of the mobile element. This is why within the computation module may be provided a compensation sub-module the function of which is to compute the displacements of the mobile element on the screen as a function of the displacements of the limb of the user holding the pointer, said function being corrected for the impact of the torsion imparted to the pointer by the user. The compensation sub-module recovers as input the outputs from a sensor which measures the linear accelerations of the pointer $a_X$, $a_y$, $a_Z$. Preferably, the sensor is a three-axis accelerometer (not shown). Advantageously, the sensors are both produced by MEMS (Micro Electro Mechanical Systems) technology, optionally within one and the same circuit (for example reference accelerometer ADXL103 from Analog Devices, LIS302DL from ST MicroElectronics reference gyrometer MLX90609 from Melixis, ADXRS300 from Analog Devices). It will be noted, however, that a camera supplemented with an image processing device can also replace the two sensors; the angular rates/velocities and linear accelerations of displacement of the pointer being deducible from a correlation of successive images, and/or from a frame by frame image processing.

The remote control of FIG. 2 can operate in an air pointing mode, where a cursor on the display is controlled by the pitch and yaw rotations of the device. Roll may be compensated to avoid the distortion created by the roll imparted by the user to the remote and better match the movements of the cursor with the intentions of the user.

The remote control can also operate in a gesture recognition mode to send to the base station commands which are defined by the gestures effected by the user, which are selected in a database of predefined gestures.

Additionally, the remote control can be used in a dynamic rotation mode. In this mode the system recognizes when the user performs a rotation around a single axis (roll, pitch or yaw axis). Such a rotation around a single axis is detected when the variations of the angles around the two other axes are below a preset threshold. The algorithms are described in detail in French patent application number 12/50140 and U.S. patent application Ser. No. 13/631,134 assigned to the assignee of this application, which are incorporated herein by reference. In a full gesture recognition mode, the system starts analysing the gesture after the user has finished the gesture. The dynamic rotation mode is different in the way that as soon as the system detects that the user is performing a rotation along a single axis, the system starts controlling a parameter of the system as a function of the angle of rotation. For example, a dynamic roll rotation can be mapped to the volume of the sound, meaning that if the user performs a single axis rotation around the roll axis, the system shows the sound level control bar where the roll angle is used to set the sound level. Dynamic rotations are also very convenient in a touch emulation mode, as will become apparent from the examples below.

Methods to combine these different modes of the remote control in an intuitive and user friendly way are disclosed by U.S. application Ser. No. 13/631,134 assigned to the assignee of this application.

Single-touch and multi-touch gestures can be emulated using the device and algorithms of various embodiments of the invention. Certain embodiments of the invention can, for example be implemented using a 3D remote control with the same hardware as the one represented with reference numeral 210 on FIG. 2. Such a remote comprises a 3-axes accelerometer and, possibly, a 3-axes gyrometer. It may be controlled by a combination of embedded software and a software module residing on the touch device, like for example MotionTools™ which is marketed by the applicant of this application. MotionTools™ allows the user to map functions to applications running on the device. When touch gestures are emulated by pointing gestures, said functions will be mapped to said touch gestures (single or multi touch). Also, some motion signals can be passed to the functions of the operating system of the touch device, so that the touch functions can be either controlled by the software which controls the remote control or by the operating system of the touch device.

FIG. 3 represents an embodiment of the invention where the remote control is used to emulate a single touch gesture (touch emulation mode).

Single-touch interaction can be emulated from yaw and pitch rotations of a motion sensed device. For instance, when the remote control 310 is rotated in yaw (330a), the system emulates a single touch moving horizontally (330b) on the screen 320, as a function of the amount of yaw. When the remote control is rotated in pitch (340a), the system emulates a single touch moving vertically (340b) on the screen 320, as a function of the amount of pitch. Optionally, the system may add a position feedback (cursor).

When using yaw and pitch rotations to control the position, it is likely that some roll movements will affect the 2D representation. Then the system compensates for the user's roll movements to keep the 2D movements on the screen clear of these artifacts. Algorithms known from the man skilled in the art of motion sensed devices can be used to implement these roll compensation mechanisms.

With a touch screen, the user can directly touch the screen wherever he or she wants. When using a remote control, a visual feedback, for example a cursor, is needed to indicate the position the remote control is referring to. Using this feedback, the user can decide when to activate the touch emulation mode in order to "touch" the screen at the desired position.

The motion sensors in the remote can be activated to start the in-air pointing by the user pressing a button or by the system depending on the application context. Then the software module on the remote will compute the pointing feedback and the user's movements are visible on the device screen.

If the pointing is activated by the user pressing a first button, a second button is needed to control the "touching" action; the user pressing this second button is equivalent to "touching" the screen. The user can simulate tapping on the touch screen by simple click-and-release actions of the button. By holding the button pressed and moving the remote, the user can also perform drag, scrolling and all the single touch moves.

If the pointing is activated by the system depending on the application context, only one button that controls the touch action is needed on the remote.

Also, motion sensed devices have an additional degree of freedom compared to touch interaction: the roll rotation which is not normally used in air pointing applications. Therefore, a user can initiate touch actions by rotating the device in roll, and there is no need for an additional second button to control the touch action.

The user can rotate the remote around the roll axis for a predefined angle to activate the touch emulation mode, and then perform drags by pointing (moving along yaw and pitch) while keeping the roll angle relatively unchanged. The touch emulation mode can be deactivated by a second rotation around the roll axis for a predefined angle, but in the opposite direction. A velocity threshold can be set for the roll rotation that (de)activates the touch emulation. This avoids situations where the user accidently deactivates the touch emulation while performing a drag action because he or she changed the roll angle during the drag.

FIG. 4 represents an embodiment of the invention where the remote control 410 is used to emulate a touch zoom command (450, 460) from the roll orientation (430) of the remote.

A preferred embodiment device of the invention is able to detect when the user performs a rotation around one of the three coordinate axes, and the system will then enter the dynamic rotation mode. In the dynamic rotation mode, the angle of rotation can be used to emulate 1 to N touch points ($P_i$) and their trajectories.

$$[P_1, \ldots, P_n] = f(\alpha)$$

For each of three possible rotations (yaw, pitch, roll), the system can emulate different multi-touch gestures. The mapping <motion gesture, touch gesture> can be determined dynamically by the system, depending upon the application which is active on the touch device. For instance, by way of illustrative example only, in a map application, the roll rotation will be mapped to a rotate map gesture. In a game, the roll can be automatically mapped to a zoom. Alternatively, the user can define which dynamic rotation is preferably mapped to the different functionalities.

These functions of the preferred embodiment of the invention are exemplified by way of illustrations only by the embodiments which are described below. Algorithms known to the man skilled in the art of motion sensed devices can be used to implement these controls once multi-touch emulation has been activated.

As can be seen on the example of FIG. 4, a remote control's roll rotation is used to emulate the zooming gesture, also known as pinch/spread multi-touch gesture, after entering in the touch emulation mode:

When rotating the device along the roll rotation, the embodiment system of the invention emulates two points, starting at $P_0$; $P_0$ (440) is, for example, the position of the cursor on the screen 420 at the start of the touch emulation mode;

When the value of the roll is increasing (for example, with a rotation to the right), the two touch points move apart. The position of the two points is transmitted in real time to the operating system (OS); the OS perceives a 2-point touch gesture with the points moving apart and thus performs a zoom in;

When the roll value is decreasing (for example with a rotation to the left), the two touch points get closer; the OS performs a zoom out.

The number of points to be emulated depends on the mapping between the motion gesture and the touch gesture. In this case the pinch/spread zooming gesture is mapped to the roll axis of the remote. Thus, as soon as the system detects the dynamic rotation around the roll axis, the system is aware that the user wants to perform a zoom and determines that N=2 points are required and that the roll angle α controls the distance between the points:

$$[P_1, P_2] = f(\alpha)$$

$$P_1 = P_0 - K\alpha$$

$$P_2 = P_0 + K\alpha$$

The zoom factor is determined by the distance between the points P1 and P2. The factor K can depend on the system (e.g. active application or screen size/resolution) or on the user's settings.

FIG. 5 represents an embodiment of the invention where the remote control 510 is used to emulate a touch rotate command (550, 560) from the yaw orientation (530) of the remote.

The rotate gesture is a two touch gesture, wherein each point follows a trajectory along a single circle: the user draws a circle with two fingers.

When rotating the device around the yaw axis, the embodiment system of the invention emulates two points, starting from $P_0$ (540) at a certain distance; $P_0$ is, for example, the position of the cursor on the screen 620 at the start of the touch emulation mode;

When the value of the yaw angle is increasing (for example with a rotation to the right), the two touch points follow a circle to the right; as in the previous example of FIG. 5, the position of the two points is transmitted in real time to the OS. The OS perceives a 2-point touch gesture with the two points in a rotating movement and thus performs a rotate right command;

When the value of the yaw angle is decreasing (for example with a rotation to the left), the two touch points follow a circle to the left and the OS performs a rotate left command.

In this case, we have N=2 and α is the yaw angle:

$$[P_1, P_2] = f(\alpha)$$

$$P_1[x,y] = P_0 - K[\cos(\alpha), \sin(\alpha)]$$

$$P_2[x,y] = P_0 + K[\cos(\alpha), \sin(\alpha)]$$

The factor K determines the radius of the circle around $P_0$ on the screen. The rotation performed by the operating system is determined by the angle of the vector $(P_1, P_2)$ compared to the initial vector at the start of the touch emulation mode, or in other words, the total angle of rotation while in the touch emulation mode. It is probably more intuitive for the user if the angle of rotation on the screen equals the angle of rotation α of the remote, but a gain may be applied if desired.

Other emulations to implement other embodiments of the invention can be embodied by programming the software which controls the remote control, using algorithms which can be derived from the algorithms used in the embodiments described above. For example, if a map is displayed on the screen of the touch device, touch gestures with one finger or two fingers can be programmed so that the user may control the orientation of the map, zoom in and out, and select a location on the map. The conversion between the motion gestures and the emulated touch gestures can depend on the application, but also on the user preferences.

Various embodiments of the invention are specifically advantageous because, depending on the location of the user in relation to the touch device (at arm's length or further), he or she may decide to select one of the two control modes of the touch device: 1) direct touch, where the user actually touches the screen, or 2) the emulated touch mode using the motion enabled remote control.

Another advantage of various embodiments of the invention is the fact that a touch screen can be used by several users at the same time. In direct touch mode is it difficult to use multiple users because it is not possible to determine which touch points belong to which user. These embodiments allow for one user to interact directly with the touch screen, and for one or more users to use the touch emulation mode by means of a remote control. In this embodiment the "touch" points generated by the different remote control devices are indexed so that the operating system will know which points belong to which remote/user. Thus the different users can "touch" the screen at the same time to, for example, play games.

In other embodiments of the invention, we can emulate a touch pressure on a tablet with the roll orientation of the device. When used with pressure sensitive tactile tablets, like those marketed for example by WACOM™, certain embodiments of invention can be used to emulate the touch pressure. The user can then use 2D pointing (controlled by yaw and pitch) AND a pressure information (controlled by roll) at the same time to control the tablet application in a same manner as he or she would do by using the tablet with a stylus pressing the surface of the tablet with a variable force. The mapping between the rotation angle and the pressure may depend on the application and the user preferences.

Figure 6:
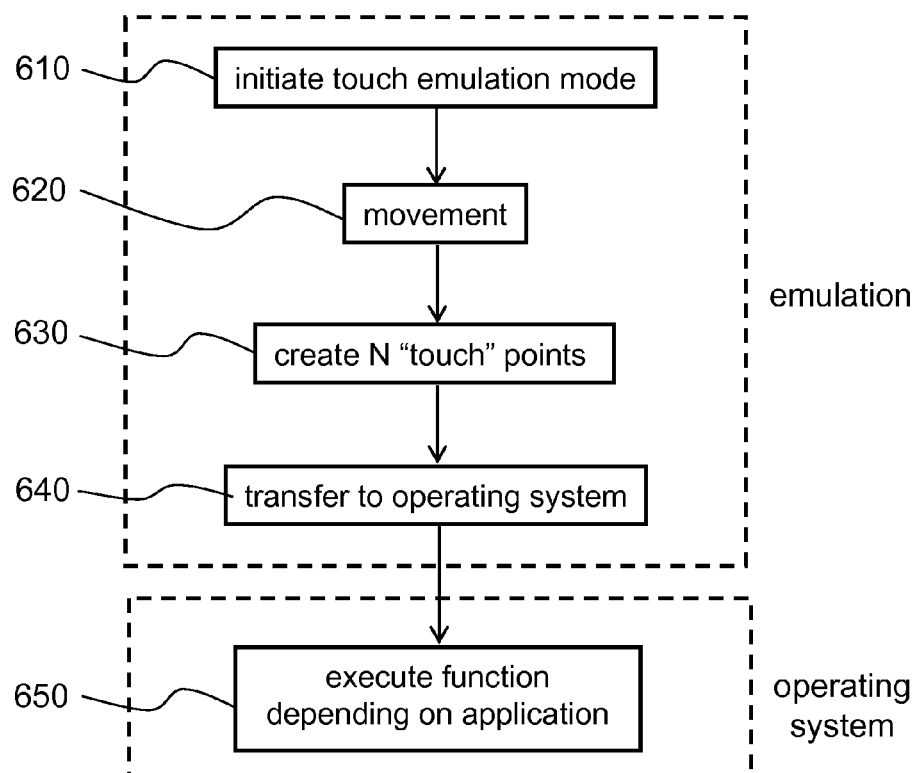
FIG. 6 represents a general flow chart of the functions performed by a system according to various embodiments of the invention.

FIG. 6 represents a general flow chart of the functions performed by a system according to various embodiments of the invention.

The general logic of an embodiment device according to the invention is to initiate the touch emulation mode at step 610. Then, the movement of the remote is determined at step 620 using for example different types of gesture recognition (recognition of preset gestures in a database; dynamic rotation . . . ). Depending on the movement, N "touch" points are created at step 630 that emulate N fingers touching the screen. The position and displacement of these N touch points is controlled by the movement of the remote.

In one embodiment, at step 640 the N points and their respective displacements are transmitted to the operating system, which interprets the displacements of the points as if it where the movements of the fingers touching the screen. The operating system then executes the associated commands, which can depend on the current running application.

In another embodiment, higher level commands can be sent to the operating system. In this case, the interpretation of the displacement of the fingers by the remote control system, will results, for example in a "zoom in" command that is sent to the operating system.

The executing at step 650 of the commands which results from the touch emulation is context dependant based on the touch device operating system settings.

Figure 7:
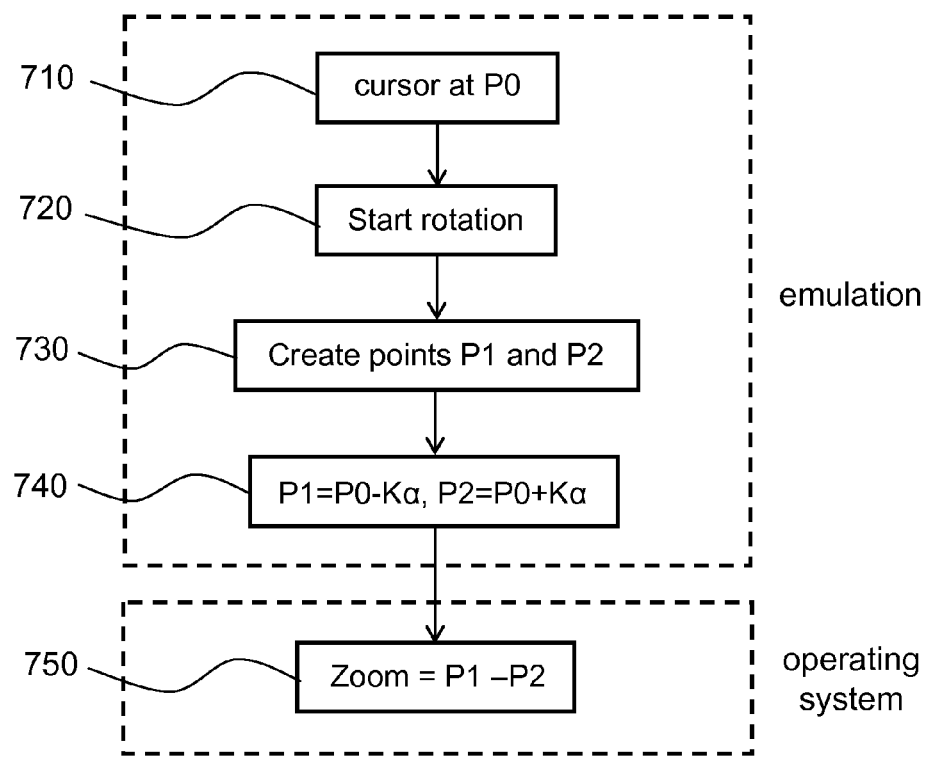
FIG. 7 represents a flow chart of the functions performed by a system according to a first specific embodiment of the invention.

FIG. 7 represents the flow chart vision of the functions performed by a system according to the embodiment of the invention displayed on FIG. 4.

Figure 8:
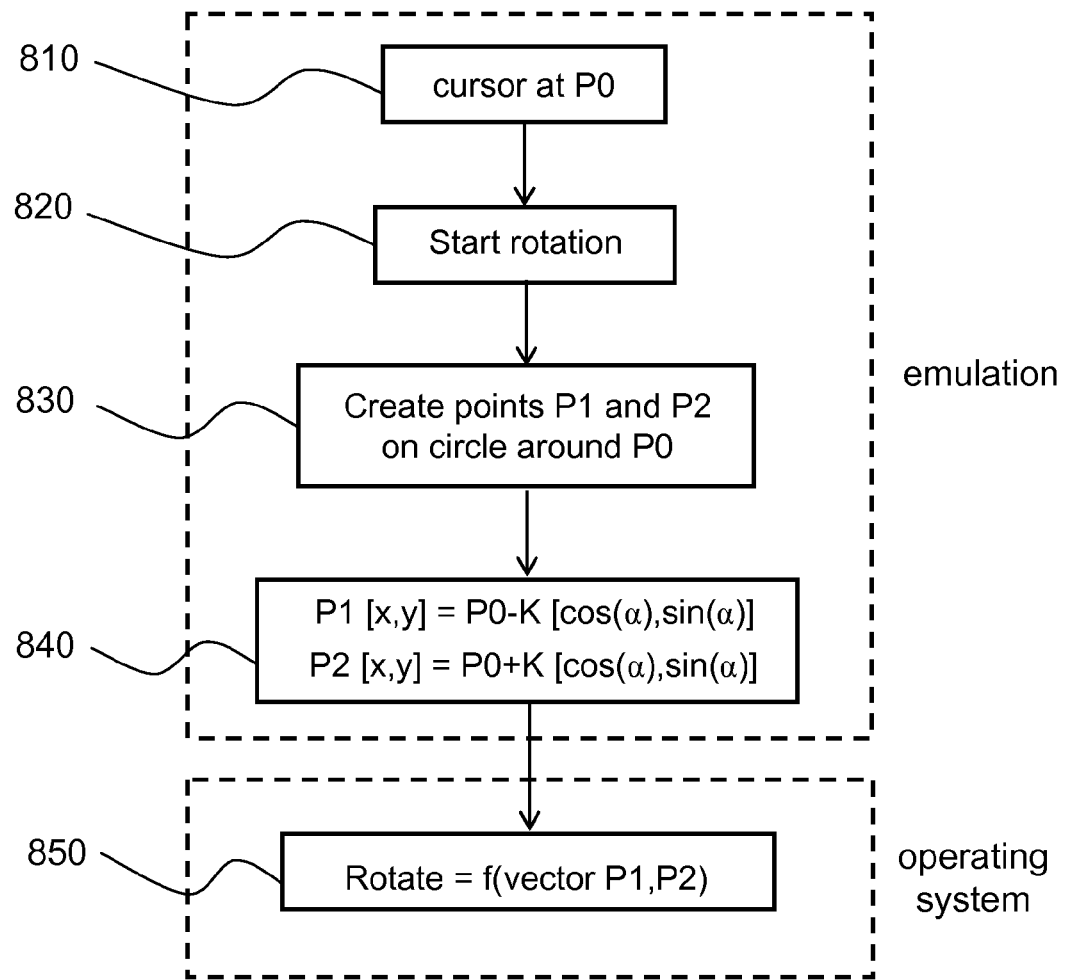
FIG. 8 represents a flow chart of the functions performed by a system according to a second specific embodiment of the invention.

FIG. 8 represents the flow chart vision of the functions performed by a system according to the embodiment of the invention displayed on FIG. 5.

These flow charts are quite similar. The touch emulation mode is started at a step 710, 810 where the cursor on the touch screen is at a position $P_0$. The user then starts a dynamic rotation; a roll rotation (720) or a yaw rotation (820) in FIGS. 7 and 8 respectively. The system then creates (730, 830) a number of N touch points, where N depends on the function mapped to the active rotation axis and in these examples N=2 (P1, P2). At steps 740, 840 an algebraic relationship determines the movements of the N touch points relative to $P_0$ as a function of the rotation angle. A number of algebraic expressions can be used such as those displayed on FIGS. 8 and 9 where α is respectively the roll and the yaw angle. Other algebraic or trigonometric expressions can be used. Although these examples use the roll and yaw axis of the remote in the mapping of the function (zoom and rotate respectively), any predefined axis of rotation, or even translation, can be used.

In the examples of FIGS. 7 and 8, two points were emulated for the zooming and rotation. The number of touch points that will be emulated when entering the touch emulation mode is defined by the processing capabilities. In both examples, the two points are shown as soon as the system will detect a dynamic rotation. Many applications exist where the fact that the system determines the number of touch points to be emulated is not a limitation. For example, a photo browser application where the user has the option to zoom and rotate the images using a dynamic rotation and use gestures to browse. In the dynamic rotation the system creates N touch points as explained above, and in the other gestures a single touch point is used to convert the gesture of the remote control into an emulated touch gesture on the screen.

To create more options and degrees of freedom, the user needs to be able to define the number of touch points, i.e. the number of fingers to be emulated. A multi-finger action on a touch screen is a multi-step process:

1. The user decides how many fingers to use
2. The user decides where to start touching the screen with each finger
3. The user moves each finger according to a pattern.

In order to be intuitive for the user, a similar strategy may be used for the touch emulation mode using a motion enabled remote. First, the user defines how many fingers to emulate, and then makes a gesture with the remote.

If no predefined action is performed to define the number of fingers, the gesture is considered a standard 1-finger gesture. Several options exist to define the number of fingers to be emulated. The user may define the amount of fingers by the use of a button. This button can be an actual button on the remote, or a virtual button on the screen. For example:

Press the number 3 before a gesture to indicate a 3-fingers gesture

Press twice the trigger button (and hold the $2^{nd}$ time during the gesture) to indicate a 2-finger gesture.

Click on a virtual button on the screen before the gesture.

Instead of using a button to define the number of fingers, a predefined motion of the remote can be used. In one embodiment, the roll angle of the remote can be used to indicate the amount of fingers to be emulated.

FIGS. 9a and 9b represent a remote, the gesture of the user and the corresponding touch command in a specific embodiment of the invention. For example, in FIG. 10a the user makes a quick rotation along the roll axis x to indicate that a multi-finger gesture will follow (910a), and then makes a swipe right (920a). The swipe right is thus considered a multi-finger swipe right. If the swipe right is not preceded by a quick roll movement, the swipe is considered as a 1-finger swipe. The rotation can be in one direction as in FIG. 9a, or can be a forth and back movement as in FIG. 9b.

The angle of the quick rotation can be used to define the amount of fingers.

FIG. 10a shows a gesture with the remote (1010a) which is not preceded by a quick roll movement, and it is thus a 1-finger gesture (1020a). Although FIG. 10a shows the remote in a horizontal position, any roll angle at the start of the gesture is allowed. A quick rotation with roll angle α between 30 and 60 degrees (1010b) means that the gesture that will follow should be interpreted as a 2-fingers gesture (1020b). Similarly, a rotation between 60 and 90 degrees (1010c) indicates a 3-fingers gesture (1020c).

Figure 11:
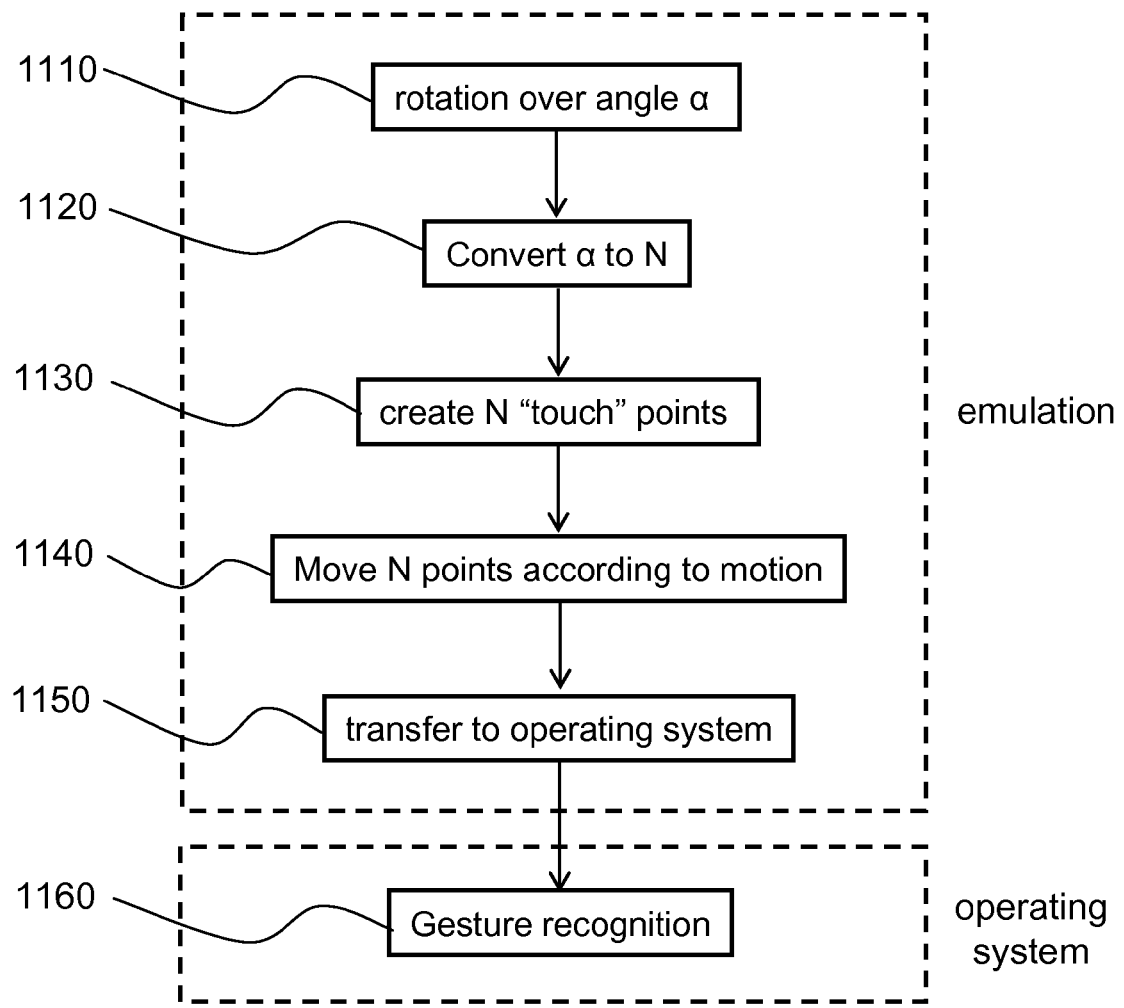
FIG. 11 represents a flow chart explaining the application of dynamic rotations according to various embodiments of the invention.

FIG. 11 represent a flow chart view of the multi-finger touch emulation in FIGS. 9 and 10. The user performs a rotation of angle α (1110). As soon as the user stops the rotation and starts the gesture, the angle α is converted into the amount N of fingers to be emulated (1120), and N touch points are created (1130). The N touch points are then displaced according to the motion imparted to the remote by the user (1140) after the initial (roll) rotation, and the position of the N points is transferred to the operating system in real time (1150). At the end of the gesture the operating system performs the gesture recognition procedure, taking into account the amount of touch points.

In one embodiment, the displacement of the different touch points is identical, meaning the points will move together according to the motion of the remote. In other words, in this embodiment the system emulates, for example, a multi-finger swipe where the user moves the fingers in unison. Using this embodiment in a photo browser application, it is possible to use a 1-finger swipe right/left to go to the next/previous photo, and use a 2-finger swipe right/left to go to the next/previous photo album.

In another embodiment, the displacement of the touch points is not identical, meaning that each point may follow a different path. Each path can be controlled by a combination of the motion of the remote and a predefined function controlled by the system, which may depend on the application.

In FIG. 10 the maximum number of fingers that can be selected is $N_{max}=3$, mapped over a maximum rotation angle $\alpha_{max}=90°$, and the minimum angle $\alpha_{min}$ to select more than 1 finger is 30°. For a rotation over angle α, the number of fingers N is given by:

$$N = 2 + int\left(\frac{\alpha - \alpha_{min}}{\alpha_{max} - \alpha_{min}} * (N_{max} - 1)\right)$$

where int represents the integer part of the result of the calculation.

The definition of $N_{max}$, $\alpha_{min}$ and $\alpha_{max}$ may depend on the user's preferences, the application, and the accuracy of the system. For example, if the user wants to select up to 5 fingers ($N_{max}=5$) over an angle $\alpha_{max}=90°$, the angular section per finger is only 18° ($\alpha_{min}=18°$). The accuracy of the system must allow for a reliable and ergonomic selection of the amount of fingers. The angular section per finger may be constant, but may also be varied to improve, for example, the ergonomics of the system.

In the examples above, the roll axis was used to determine the number of fingers to be emulated, but any other predefined axis might be used and may depend on the preferences of the user. If the selected axis is also used for dynamic rotations, an additional velocity threshold may be introduced. For example, in the case where the dynamic rotation of the roll axis is used for zooming (FIGS. 4 and 7) and the roll axis is also used to select the amount of fingers (FIGS. 9 and 10). A dynamic rotation is in general a slow movement, with limited angular velocities. Therefore, a threshold can be defined, where, if the angular velocity is below the threshold the motion is considered a dynamic rotation, but if the angular velocity is above the threshold, the rotation is used to define the number of fingers.

Figure 12:
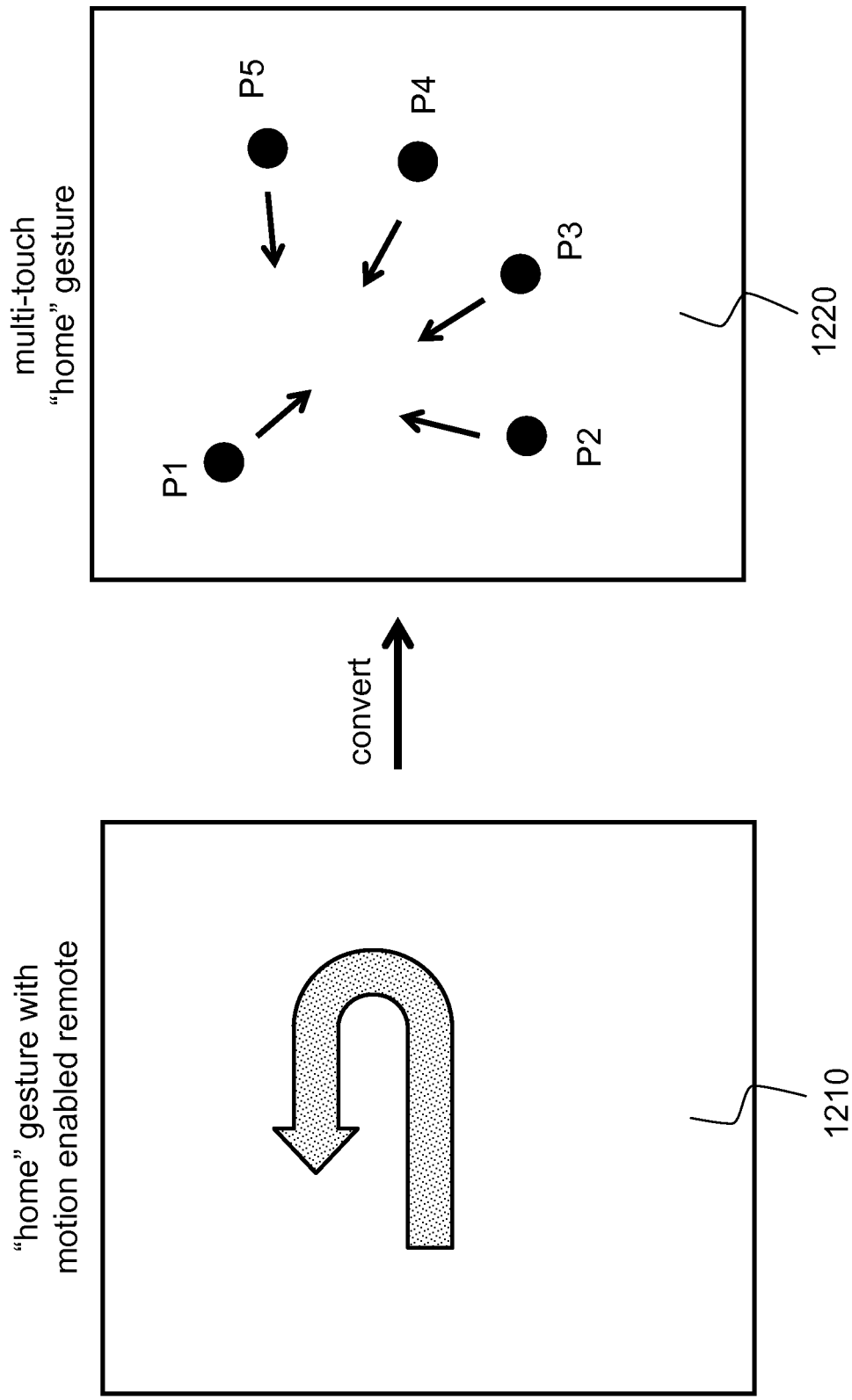
FIG. 12 shows an example of a conversion between the "home" motion gesture and the "home" multi-touch gesture.

FIG. 12 displays another embodiment of the invention where a gesture made with the remote control is transformed into another touch gesture. In this example the "home" gesture (1210) made by the remote is converted into a 5-finger pinch touch gesture (1220), which is then interpreted by the operating system as a "home" touch gesture.

Figure 13:
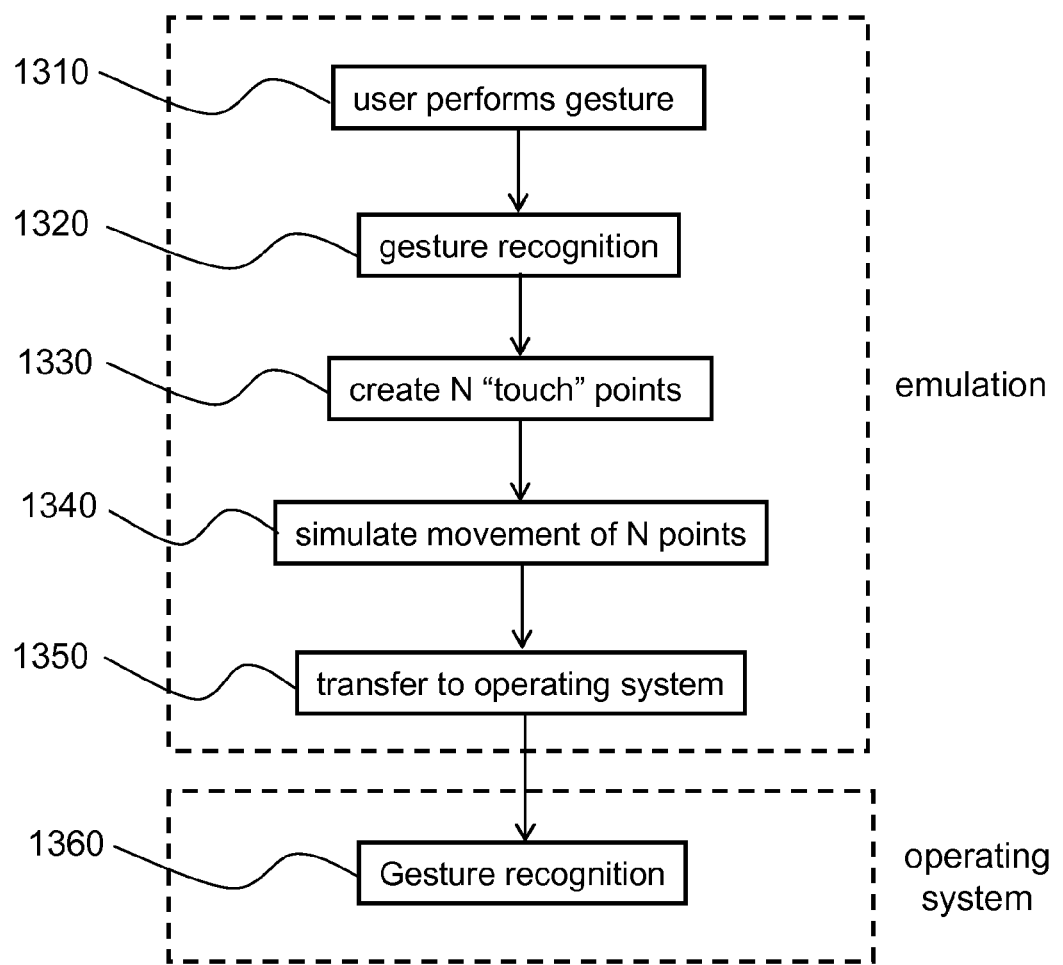
FIG. 13 shows a flow chart of the conversion between a motion gesture and a multi-touch gesture.

FIG. 13 displays a flow chart view of this embodiment of the invention. The user performs a gesture (1310), which is then interpreted by the remote control system in the gesture recognition capabilities (1320). The gesture recognition library also contains the information on how to convert the motion gestures into multi-touch gestures. Subsequently, N touch-points are created (1330), where N depends on the multi-touch gesture, and the displacement of the touch point is simulated by the processing capabilities of the remote (1340). The positions of the moving points are transmitted to the operating system (1350), which then performs its own gesture recognition process (1360). The speed of the simulated touch gesture should be as high as possible as allowed by the operating system in order to minimize the delay and have an as high as possible reactivity of the system.

Emulation of multi-touch gestures implies determining the type of gesture, the number of fingers involved and the trajectory of the fingers. It is not necessary to convert the signals of the motion sensors into touch signals for achieving this result. It is only necessary to be able to recognize the gesture performed by the user with the remote. For example, the sequence of selecting the number of fingers, and then performing the gesture can be completely analysed by the processing capabilities of the remote control system, and the resulting (high level) command of the gesture recognition can be transmitted to the operation system for execution. This would mean that the user can remotely interact with a screen according to an embodiment of the invention as if it were a touch screen, even if the screen does not have any touch processing capabilities. Alternatively, the remote can automatically adapt in which mode it should operate, depending on the type of screen the user is using (touch screen or not).

The examples disclosed in this specification are only illustrative of some embodiments of the invention. They do not in any manner limit the scope of said invention which is defined by the appended claims.

The invention claimed is:

1. A user to machine interface comprising:
   at least a remote control with at least one motion sensor,
   a communication link between the remote control and the machine, and
   at least one processor for processing the motion signals from said at least one motion sensor,
   wherein said machine runs an operating system configured to receive touch input points when a user touches a screen connected to the machine, said at least one processor being further configured for initiating a touch emulation mode based on a triggering event, using the at least one motion sensor to perform a gesture recognition of at least a 3D gesture of a user in the air with the remote control, generating at least one emulated touch point corresponding to a touch point on the screen, based on said at least a 3D gesture of a user in the air, and sending the at least one emulated touch point to the operating system of the machine to simulate the user touching the screen at the position of the at least one emulated touch point.

2. The interface of claim 1, wherein the touch emulation mode comprises a definition of a number N representative of a number of points on a screen connected to the machine, a movement or position of the points being controlled by the output of the recognition.

3. The interface of claim 2, wherein a gesture of a user with a remote control controls a joint movement of the N points on the screen.

4. The interface of claim 2, wherein the triggering event is a gesture of rotation imparted by a user to a remote control around a predefined axis of said remote control, with one of an angle of rotation and an energy of motion higher than a predetermined threshold.

5. The interface of claim 2, wherein the definition of the number N is given by one of the triggering event and a gesture of a user with a remote control.

6. The interface of claim 5, wherein the gesture is a rotation around a predefined axis, and the definition of the number N is determined using an angle of rotation α of the remote control around said axis.

7. The interface of claim 6, wherein, for a range of the angle α from a threshold $α_{min}$ to a maximum $α_{max}$ and a maximum number of points $N_{max}$ to be controlled by the remote control, N is defined by two plus an integer quotient of $(α-α_{min})/(α_{max}-α_{min})*(N_{max}-1)$.

8. The interface of claim 2, wherein the movement or position of the points are part of the output of the recognition.

9. The interface of claim 8, wherein the at least one processor can cause a remote control to operate in the touch emulation mode based on the determination that the machine is capable of recognizing movement or position of the points.

10. The interface of claim 1, wherein the triggering event is one of a contextual change in an application run by the machine, a press of a button on a remote control by a user and a gesture of a user with a remote control.

11. The interface of claim 1, wherein the gesture being recognized defines a pressure applied by a user to a screen connected to the machine.

12. The interface of claim 11, wherein the gesture is a rotation around a predefined axis of angle α, said angle α defining the pressure applied by the user to the screen.

13. The interface of claim 1, further being configured for use by at least two users, at least one of them with a remote control for operating the interface in a touch emulation mode.

14. The interface of claim 13, wherein each one of the users using a remote control is defined by an index which is used to identify the gestures being recognized.

15. A method of operating a user to machine interface comprising:
   moving in space by at least a user a remote control with at least one motion sensor,
   using a communication link between the remote control and the machine, and
   processing signals from the at least one motion sensor, wherein said machine runs an operating system configured to receive touch input points when a user touches a screen connected to the machine, said method further comprising initiating a touch emulation mode based on a triggering event, using the at least one motion sensor to perform a gesture recognition of at least a 3D gesture imparted by a user in the air to the remote control, generating at least one emulated touch point corresponding to a touch point on the screen based on said at least a 3D gesture imparted by a user in the air, and sending the at least one emulated touch point to the operating system of the machine to simulate the user touching the screen at the position of the at least one emulated touch point.

16. The method of claim 15, wherein the touch emulation mode comprises a definition of a number N representative of a number of points on a screen connected to the machine, a movement or position of the points being controlled by the output of the recognition.

17. The method of claim 16, wherein the number N is at least partly defined by a value of an angle of a rotation around an axis of a remote control imparted by a user of said remote control relative to a threshold angle.

18. The method of claim 15, wherein a rotation around a predefined axis of the remote of an angle $\alpha$ defines a touch gesture of a pinch or spread zooming of factor k, said factor k of zooming being a function of said angle $\alpha$.

19. The method of claim 15, wherein a rotation around a predefined axis of the remote of an angle $\alpha$ defines a touch gesture of rotation of said angle $\alpha$.

* * * * *